Nov. 8, 1938. A. H. OELKERS 2,135,728
TRUCK
Filed April 18, 1934 4 Sheets-Sheet 1

Inventor
Alfred H. Oelkers,
By Wilkinson, Huxley, Byron & Knight
Attorneys

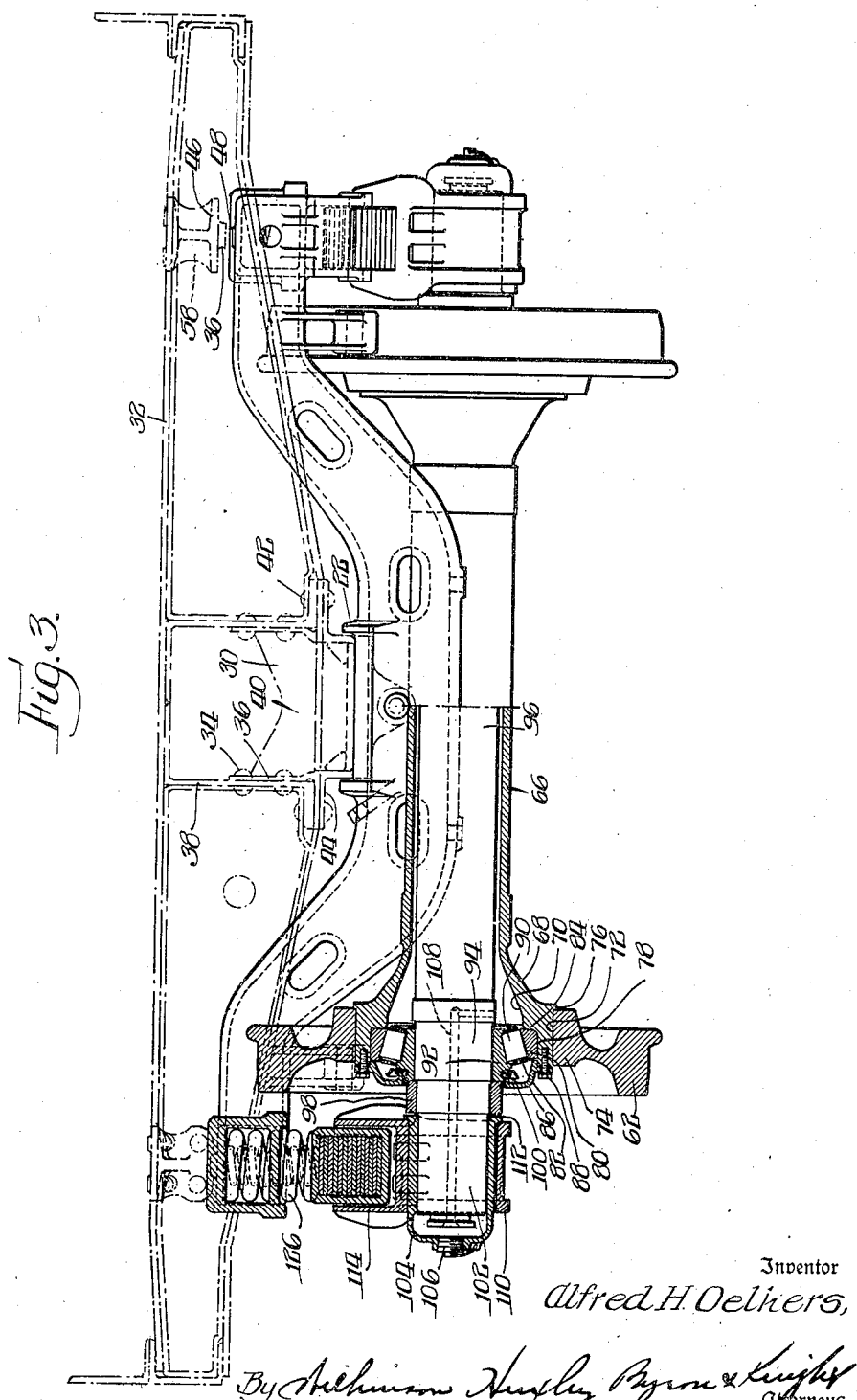

Nov. 8, 1938.   A. H. OELKERS   2,135,728
TRUCK
Filed April 18, 1934    4 Sheets-Sheet 3

Inventor:
Alfred H Oelkers,
By Wilkinson, Huxley, Byron & Knight
Attorneys.

Nov. 8, 1938.  A. H. OELKERS  2,135,728
TRUCK
Filed April 18, 1934  4 Sheets-Sheet 4

Inventor:
Alfred H. Oelkers
By Wilkinson, Huxley, Byron & Knight
Attorneys.

Patented Nov. 8, 1938

2,135,728

UNITED STATES PATENT OFFICE 2,135,728

TRUCK

Alfred H. Oelkers, Chicago, Ill., assignor to American Steel Foundries, Chicago, Ill., a corporation of New Jersey Application April 18, 1934, Serial No. 721,099

36 Claims. (Cl. 105—157)

This invention pertains to two-wheel trucks.

It is an object of this invention to provide a freight car truck of much simpler structure than the ordinary construction, and one wherein there is a great saving in weight whereby a car provided with such trucks may be readily moved about with comparatively little effort as by hand.

Another object is to provide a two-wheel truck of such design that a car equipped with such trucks can readily negotiate curvatures of existing tracks, thereby meeting all service conditions, the truck being adapted to carry the usual standard car body which may be adapted for use on this truck by the addition of simple and inexpensive parts.

Still another object is to provide a two-wheel freight car truck wherein either roller bearing or friction bearing wheel and axle assemblies may be used, and wherein all friction wearing parts are eliminated.

Yet another object is to provide a two-wheel freight car truck of such design that the load of the car body will be equalized on the two wheels supporting the truck, the load being carried analogously to that of the present day four-wheel car truck.

A further object is to provide a two-wheel car truck wherein a snubbing spring suspension is used, and wherein all thrusts, lateral or longitudinal, are transmitted from the car body to the wheels, or vice-versa, through the medium of resilient means whereby all such thrusts are softened, and the usual wearing of unsprung parts against each other is eliminated, the unsprung parts of the truck being limited to the wheel and axle assemblies.

Another further object is to provide a two-wheel freight car truck wherein there is no derailing tendency due to the equalization of the loads on the two wheels, and wherein the normal side sway of a car is permitted without the tendency of such normal sway to lift the wheels from the track.

Yet a further object is to provide a two-wheel car truck adapted to accommodate clasp brake equipment, and wherein the standard car body may be applied to the truck by the use of simple straddle castings peculiarly adapted to this design of truck.

Another object is to provide a two-wheel truck construction which will eliminate a large part of the maintenance at present required on freight car trucks, and wherein all conditions of service and manufacture are fulfilled, the truck being particularly well adapted for high speeds in freight car service.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 3 is an end elevation partly in section of the two-wheel truck and associated car body illustrated in Figure 1;

Figure 2:
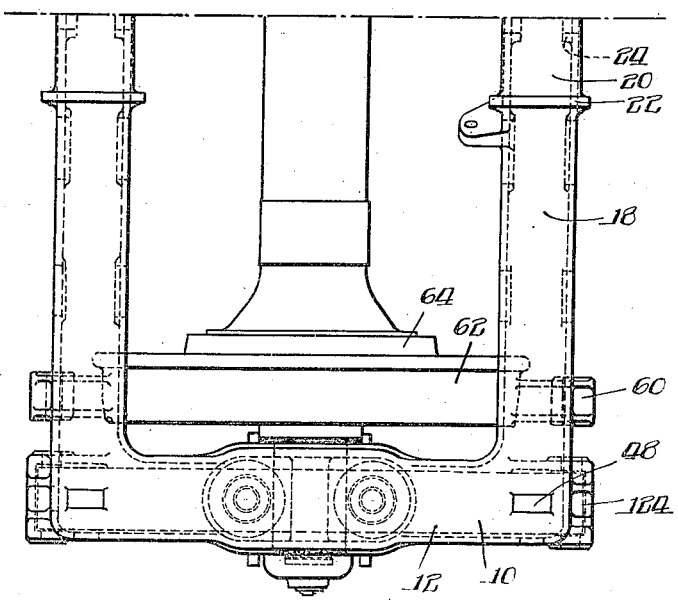
Figure 2 is a fragmentary top plan view of the two-wheel truck illustrated in Figure 1.
Figure 1:
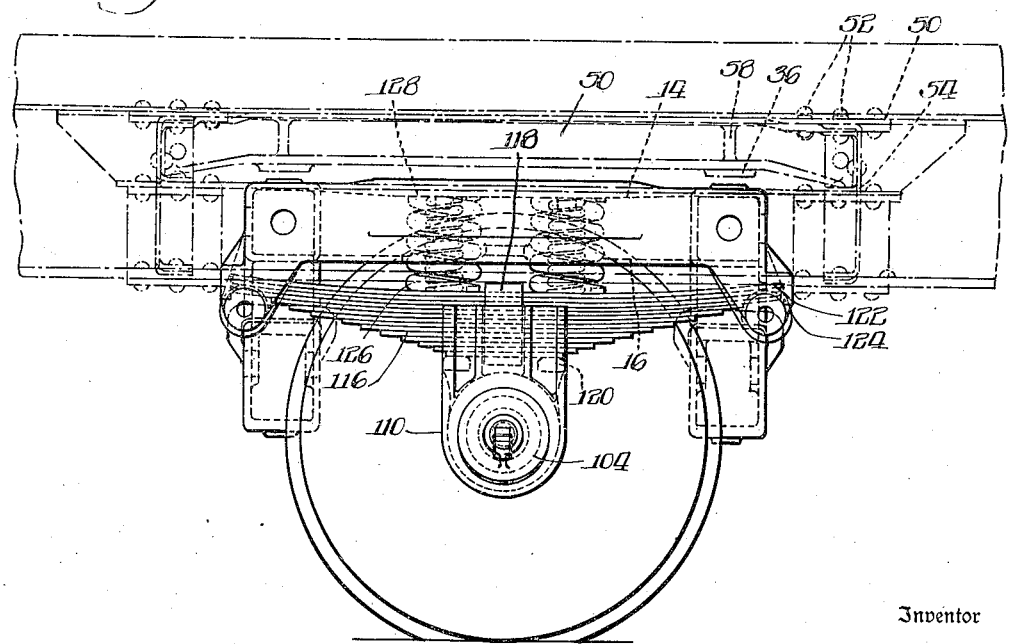
Figure 1 is a fragmentary side elevation of a two-wheel car truck embodying the invention, showing the application thereto of a railway vehicle body.
Figure 4:
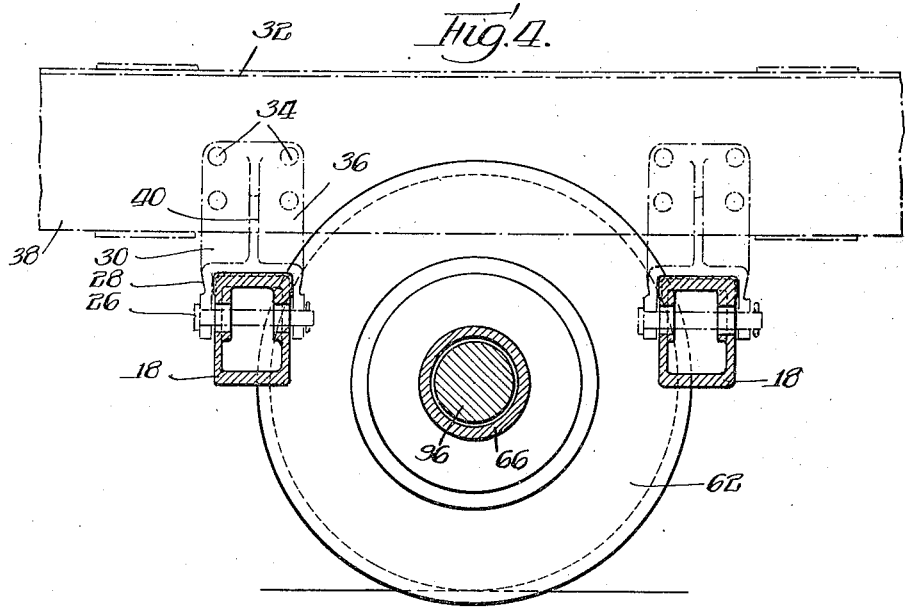
Figure 4 is a sectional elevation taken substantially in the plane of the longitudinal center line of the truck.

Referring first of all more particularly to the construction illustrated in Figures 1 to 4 inclusive, wherein a roller bearing wheel and axle assembly is used, the two-wheel truck consists essentially of a truck frame 10 including the side frame 12 shown as of substantially box-girder construction having upper and lower chords 14 and 16 forming compression and tension members thereof, the spaced side frames 12 being connected by means of the spaced end connecting members or bolsters 18, also preferably of box-section. The end members intermediate the ends thereof are depressed or offset downwardly and are provided with bearings or center bearers 20 provided adjacent the longitudinal center line of the truck and defined by the upwardly extending flanges 22. The center bearers are provided with the aligned apertured bosses 24 for the loose reception of securing means such as the pins 26 passing therethrough and through the depending jaws 28 of the center bearing members 30 which are adapted to be supported on the center bearers 29 and embrace that portion of the end connecting members. The members 30 are suitably secured to the car body 32 by means of the rivets or other securing means 34 which secure the flanges 36 to the center sills 38. The flanges 36 extend between the spaced center sills and are reenforced by means of the web 40, and additional securing means 42 secure the outwardly extending flanges 44 of the member 30 to the under side of the center sills. The car body is provided with the side bearing members 46 disposed in substantially vertical alignment but normally spaced from the side bearings 48 provided on the side frames, and as shown substantially in alignment with the end connecting members 18.

In the construction shown the side bearings 46 are provided on the casting 50 secured to the car body as at 52 between adjacent body bolsters or transoms 54, being secured thereto as at 56. The member 50 thus formed is of substantially I-beam section such as illustrated in Figure 3, transverse reenforcing gussets or webs 58 being disposed between the upper and lower members in substantially vertical alignment with the side bearings 46.

The end connecting members are provided with the depending brake hanger brackets 60 disposed substantially in the plane of the wheel 62 of the wheel and axle assembly 64. The wheel and axle assembly 64 consists essentially of an outer substantially rotatable axle 66 flared adjacent the ends thereof as at 68 to form a lubricant recess 70. The axle at the ends thereof is provided with the hub receiving portion 72 adapted to receive the wheel hub 74 of the wheel 62, the wheel preferably being pressed on the portion 72, the inner limiting shoulder 76 being provided for determining the position of the wheel. The end of the outer axle is provided with the bearing receiving portion 78 adapted to receive the outer racering 80 of the roller bearing assembly 82, the outer racering abutting the shoulder 84 for determining the position of said outer racering, the racering additionally being prevented from moving outwardly by means of an inwardly extending flange provided on the cover plate 86 bolted or otherwise secured as at 88 to the outer axle to close the lubricant recess formed therein.

The bearings may be of either the Simplex or Timken type having rollers 90 interposed between the outer racering 78 and the inner racering 92. The inner racering is press-fitted on a portion 94 of an inner substantially non-rotatable axle 96 extending through the tubular axle and outwardly of the ends thereof. The inner racering is secured in operative position by means of the shrink collar 98 shrunk on the inner axle and in abutment with the inner racering, and suitable baffle means 100 is disposed between the cover plate and the inner racering. The end journal portion 102 of the inner axle is provided with the journal sleeve 104 embracing said end and provided with the removable plug 106 disposed in alignment with the lubricant channel 108 provided in the inner axle and extending to the lubricant recess 70 whereby lubricant may be supplied thereto without removing the cover plate.

The journal sleeve 104 is received in the journal member 110 with a slightly loose fit. The inner upstanding flange 112 of the sleeve, however, serves to prevent dissociation of said members, and maintains the sleeve in operative cooperation with the inner axle. The member 110 is provided with the spaced upstanding flanges 114 adapted to receive the longitudinally disposed leaf spring 116, the flanges 114 being offset around the spring band 118 to form a pocket therefor whereby the spring band clears the journal member, spaced seats 120 being on each side of the spring band recess whereby the lower leaf of the leaf spring engages on the spaced seats 120. The outer ends of the leaf spring are adapted to be seated on the leaf spring seats 122 disposed in suitable housings 124 provided on the side frames, the seats 122 preferably being arcuate whereby the span of the leaf spring is slightly diminished upon deflection thereof, said housings 124 being provided with end and side walls to accommodate end and lateral thrusts between said side frame and leaf spring. The coil springs 126 are seated on the upper leaf of the leaf spring substantially in vertical alignment with the spring seats 120, and the lower chord 16 of the side frame is apertured to permit the coil springs to be seated on the coil spring seats 128 provided on the upper chord 14 of said side frame. This arrangement of the springs, which may be termed a series-parallel arrangement, causes increased frictional absorption to occur upon deflection of the leaf and coil springs. It is of course appreciated that a roller bearing wheel and axle assembly may be used with the standard journal box construction as below described, an assembly such as shown and described in U. S. Patent No. 2,054,861, granted June 22, 1936, being used.

Figure 5:
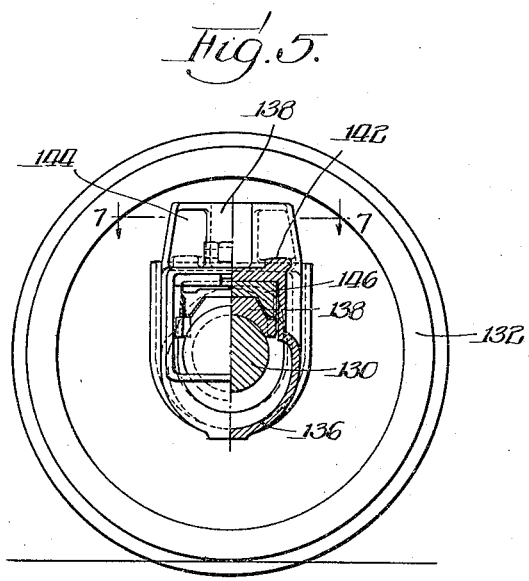
Figure 5 is an elevation partly in section of a standard wheel and axle assembly and an associated standard type journal box provided with means whereby it may be used with the two-wheel truck which is the subject matter of this invention.
Figure 6:
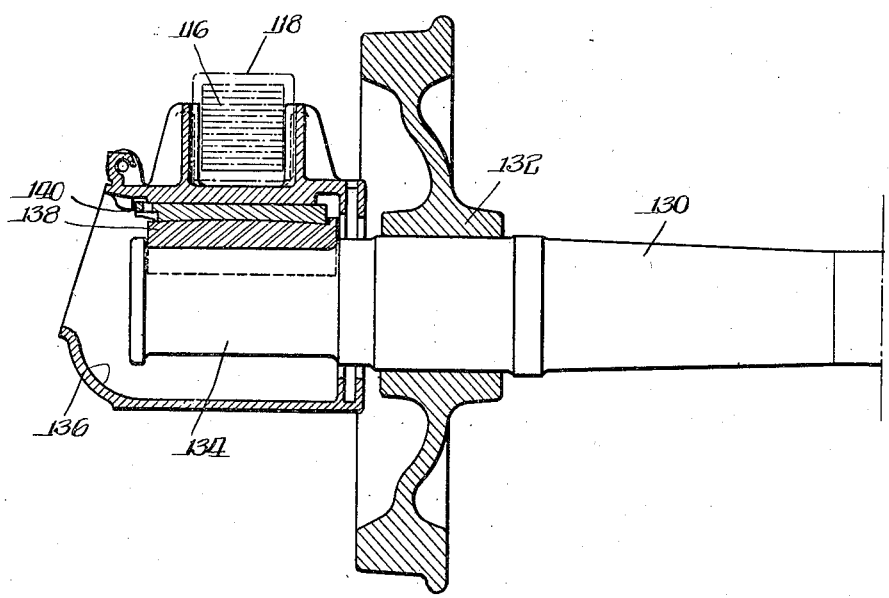
Figure 6 is an elevation partly in section of the friction wheel and axle assembly and the associated journal box illustrated in Figure 5.
Figure 7:
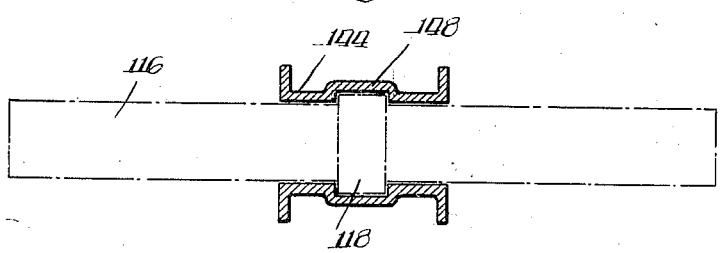
Figure 7 is a fragmentary sectional top plan view taken substantially in the plane indicated by the line 7—7 of Figure 5 showing the association of the journal box guide means with the longitudinal leaf spring.

In the construction illustrated in Figures 5 to 7 inclusive, the standard form of journal box is illustrated, and the ordinary friction wheel and axle assembly. This wheel and axle assembly consists essentially of the rotary axle 130 provided with the wheel 132, the journal end 134 of the friction axle being received in the usual form of journal box 136. The usual brasses and wedges 138 and 140 are interposed between the journal end of the friction axle and the roof of the journal box. In this construction the journal box roof is provided with the spaced seats 142 corresponding to the leaf spring seats 120, said seats being provided between the spaced upwardly extending walls 144 for the reception of the leaf spring 116, the spring band 118 thereof being received between the offset portions 148 of the walls 144. The recess thus formed permits clearance between the spring band and the roof of the journal box whereby the seats 142 are the sole journal box seats for the leaf spring. It is of course to be understood that the truck construction is otherwise similar to that described with respect to Figures 1 to 4 inclusive.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car, the combination of a car body, a truck including a truck frame having spaced end members and connecting side frames, side bearings on said side frames in alignment with said end members, side bearings on said car in vertical alignment with said first named side bearings, a wheel and axle assembly disposed between said end members, resilient means disposed between said wheel and axle assembly and said truck frame, means on said car body engaging said end members for securing said car body to said truck, and means loosely connecting said end members and said resilient means.

2. In a truck, the combination of a truck frame including a side frame and connecting spaced bolsters, a wheel and axle assembly between said bolsters, spaced seats on said wheel and axle assembly, seats on said side frame on each side of said wheel and axle assembly, a semi-elliptic leaf spring engaging said seats, intermediate seats on said side frame in substantially vertical alignment with said first named seats, and coil springs seated on said intermediate seats and engaging said leaf spring.

3. A journal assembly comprising a member including an axle embracing substantially cylindrical bearing portion and upwardly extending spaced walls provided with an offset, and spaced leaf spring seats disposed between said walls, and a leaf spring disposed on said seats and embraced by said offsets.

4. A journal assembly comprising a box having upwardly extending spaced walls disposed on the roof thereof, said walls being provided with an offset, said roof being provided with spaced leaf spring seats between said walls, and a leaf spring disposed on said seats and embraced by said offsets.

5. In a truck frame for a two-wheel car truck, the combination of a side frame and spaced end bolsters, said side frame being provided with depending spring seats and intermediate spring seats, and side bearings in substantially horizontal alignment with said end bolsters.

6. In a truck frame for a two-wheel car truck, the combination of spaced side frames of substantially box-section, and end connecting bolsters integrally connecting said side frames, the lower member of said side frames being provided with spaced spring seats, the upper member of said side frames being provided with spaced spring seats, the lower member of said side frames being apertured in vertical alignment with said second named spring seats.

7. In a truck frame for a two-wheel car truck, the combination of spaced side frames of substantially box-section, and end connecting bolsters integrally connecting said side frames, the lower member of said side frames being provided with spaced spring seats, the upper member of said side frames being provided with spaced spring seats, the lower member of said side frames being apertured in vertical alignment with said second named spring seats, said end connecting members being depressed intermediate the ends thereof and being provided with bearings adjacent the longitudinal center line of the truck frame.

8. A straddle casting including a body portion having upwardly extending securing flanges, a reenforcing web connecting said flanges, outwardly extending flanges disposed adjacent said first named flanges, and a depending bearer portion extending between said first named flanges, said bearer portion being provided with spaced depending securing flanges.

9. A car side bearing including an elongated body portion provided with plane longitudinally spaced side bearing members, said body portion being provided with top and end connecting flanges.

10. In a two-wheel truck, the combination of a wheel and axle assembly, a truck frame including spaced side frames and end connecting bolsters, journal means cooperating with the journal ends of said wheel and axle assembly, said journal means being provided with spaced leaf spring seats, a leaf spring seated on said seats and forming the sole connection between said wheel and axle assembly and said truck frame, and resilient means interposed between said side frame and leaf spring in substantially vertical alignment with said spring seats.

11. In a two-wheel truck, the combination of a wheel and axle assembly, a truck frame including side frames and end connecting bolsters, spring seats on said side frame, said spring seats being provided with side and end walls for accommodating lateral and end thrusts, journal means cooperating with the journal ends of said wheel and axle assemblies, said journal means being provided with upwardly extending spaced walls having offset portions for accommodating the spring band of a leaf spring, spaced leaf spring seats between said walls, a leaf spring having a spring band received in said recess, said leaf spring being seated on said seats, said leaf spring being embraced by said walls, the ends of said leaf spring being seated on said first named seats, said leaf spring being the sole connection between said wheel and axle assembly and said truck frame, and coil springs interposed between said truck frame and said leaf spring and disposed substantially in vertical alignment with said second named seats whereby said coil springs serve to increase the frictional absorption in said leaf springs on deflection thereof.

12. A journal assembly comprising a member having a cylindrical sleeve provided with a bearing portion, spaced walls extending from said bearing portion, each of said walls having an offset, and a leaf spring disposed on said bearing portion and embraced by said offsets.

13. In a truck, the combination of a wheel and axle assembly, a truck frame, a journal member associated with said assembly, said member having a cylindrical sleeve embracing an axle of said assembly and a bearing portion cooperating therewith, said sleeve being provided with upstanding spaced walls each having an offset, and a spring assembly disposed between said member and frame and having a spring band disposed in said offsets.

14. In a truck, the combination of a wheel and axle assembly, a truck frame, a journal member associated with said assembly, said member having a cylindrical sleeve embracing an axle of said assembly and a bearing portion cooperating therewith, said sleeve being provided with upstanding spaced walls each having an offset, spaced spring seats between said walls, and a spring assembly disposed between said frame and member and mounted on said seats, said spring assembly having a spring band disposed in said offsets.

15. In a truck, the combination of a truck frame, said frame having depending spring housings having spring seats and end and side walls, a wheel and axle assembly having a journal member provided with a spring seat disposed above the axle and intermediate the spring seats of said frame, a leaf spring disposed between said frame and assembly, said leaf spring having its ends loosely received in said housings and engaging said spring seats, and means cooperating with said leaf spring for transfer of thrust between said assembly and frame, said means including said end and side walls of said housings.

16. In a two-wheel truck, the combination of a truck frame comprising side members connected by end members, said frame having depending leaf spring seats and a coil spring seat therebetween, a wheel and axle assembly disposed between said end members and having spaced leaf spring seats intermediate the leaf spring seats of said frame, a leaf spring disposed between the frame and assembly and engaging said leaf spring seats, and a coil spring disposed between said leaf spring and frame and engaging said coil spring seat on the frame.

17. In a two-wheel truck, the combination of a truck frame comprising side members connected by end members, said frame having depending leaf spring seats and intermediate coil spring seats, a wheel and axle assembly disposed between said end members and having spaced leaf spring seats intermediate the leaf spring seats of said frame, a leaf spring disposed between the frame and assembly and engaging said leaf spring seats, and spaced coil springs disposed between said leaf spring and frame and engaging said coil spring seats on the frame.

18. In a truck, the combination of a truck frame, said frame having depending spring seats, a wheel and axle assembly having a journal bearing member embracing the axle of said assembly, said bearing member having upstanding spaced walls and a spring seat therebetween disposed above said axle, and a leaf spring positioned between said walls and disposed between said frame and assembly and engaging said spring seats and provided with a spring band, said bearing member and depending spring seats having means cooperating with said spring band and ends, respectively, for transfer of longitudinal thrust between said frame and assembly.

19. In a truck, the combination of a truck frame, said frame having spaced leaf spring seats and an intermediate coil spring seat, a wheel and axle assembly having a leaf spring seat, a leaf spring mounted on said assembly and having the ends thereof slidably engaging the seats of said frame, means cooperating with said leaf spring for transfer of longitudinal thrust between said assembly and frame, and a coil spring between said leaf spring and frame and engaging the coil spring seat thereof.

20. In a truck, the combination of a truck frame, said frame having spaced leaf spring seats and spaced intermediate coil spring seats, a wheel and axle assembly having spaced leaf spring seats substantially in alignment with the intermediate coil spring seats of said frame, a leaf spring disposed between said frame and assembly and engaging the seats thereof, and spaced coil springs between said leaf spring and frame and engaging the coil spring seats thereof.

21. In a truck, the combination of a truck frame, said frame having depending housings each enclosing a leaf spring seat formed on said frame and spaced intermediate coil spring seats, a wheel and axle assembly having spaced leaf spring seats substantially in alignment with the intermediate coil spring seats of said frame, a leaf spring disposed between said frame and assembly and engaging the seats thereof, and spaced coil springs between said leaf spring and frame and engaging the coil spring seats thereof.

22. In a truck, the combination of a truck frame, said frame having spaced leaf spring seats and an intermediate coil spring seat, a wheel and axle assembly having a bearing member provided with upstanding spaced walls with a spring seat therebetween, a leaf spring disposed between said walls and engaging the seats of said assembly and frame, and a coil spring between said leaf spring and frame and engaging the coil spring seat thereof, said bearing member and spaced leaf spring seats having means cooperating with said leaf spring for transfer of longitudinal thrust between said frame and assembly.

23. In a truck, the combination of a truck frame, said frame having spaced leaf spring seats and spaced intermediate coil spring seats, a wheel and axle assembly having a bearing member provided with upstanding spaced walls with spaced spring seats therebetween, a leaf spring disposed between said walls and engaging the seats of said assembly and frame, and coil springs between said leaf spring and frame and engaging the coil spring seats thereof.

24. In a truck, the combination of a truck frame having a side frame provided with upper and lower members, the lower of said members being provided with spaced spring seats, the upper of said members being provided with a spring seat, a wheel and axle assembly having spaced leaf spring seats, a leaf spring engaging said first-named seats and the seats on said assembly, and a coil spring between said leaf spring and upper member and extending through openings in said lower member and engaging the spring seat of said upper member.

25. In a truck, the combination of a truck frame having a side frame provided with upper and lower members, the lower of said members being provided with spaced spring seats, the upper of said members being provided with spaced spring seats, a wheel and axle assembly having spaced leaf spring seats, a leaf spring engaging said first-named seats and the seats on said assembly, and coil springs between said leaf spring and upper member and extending through openings in said lower member and engaging the spring seats of said upper member.

26. In a car, the combination of a car body, a truck including a truck frame having spaced end members and connecting side frames, a wheel and axle assembly disposed between said end members, resilient means disposed between said wheel and axle assembly and said truck frame, said car body having longitudinally spaced center bearing members engaging said end members substantially centrally thereof, and means for pivotally securing said center bearing members to said end members.

27. In a car, the combination of a car body, a truck including a truck frame having spaced end members and connecting side frames, a wheel and axle assembly disposed between said end members, resilient means disposed between said wheel and axle assembly and said truck frame, said car body having longitudinally spaced center bearing members embracing said end members substantially centrally thereof, and means for pivotally securing said center bearing members to said end members.

28. In a car, the combination of a car body, a truck including a truck frame having spaced end members and connecting side frames, a wheel and axle assembly disposed between said end members, resilient means disposed between said wheel and axle assembly and said truck frame, said car body having longitudinally spaced center bearing members provided with spaced jaws embracing said end members substantially centrally thereof, and means for pivotally securing said center bearing members to said end members.

29. In a car, the combination of a car body, a truck including a truck frame having spaced end members and connecting side frames, said end members having a central depressed portion, a wheel and axle assembly, resilient means disposed between said wheel and axle assembly and said truck frame, said car body having means engaging to a limited extent the depressed portion of said end members for securing said car body to said truck.

30. In a car, the combination of a car body, a truck including a truck frame having spaced end members and connecting side frames, a wheel and axle assembly disposed between said end members, said end members having a central depressed portion, resilient means disposed between said wheel and axle assembly and said truck frame, said car body having means non-resiliently engaging the depressed portion of said end members for securing said car body to said truck.

31. In a car, the combination of a car body, a truck including a truck frame having spaced end members and connecting side frames, a wheel and axle assembly disposed between said end members, said end members having a central depressed portion, resilient means disposed between said wheel and axle assembly and said truck frame, said car body having means engaging the depressed portion of said end members for securing said car body to said truck, and means for pivotally securing said last-named means to said end members.

32. In a car, the combination of a car body, a truck including a truck frame having spaced end members and connecting side frames, a wheel and axle assembly disposed between said end members, said end members having a central depressed portion, resilient means disposed between said wheel and axle assembly and said truck frame, said car body having means non-resiliently engaging the depressed portion of said end members for securing said car body to said truck, and means for pivotally securing said last-named means to said end members.

33. A truck frame for a two-wheel car truck, comprising spaced side frames, and end bolsters connecting said side frames, said end bolsters having a central depressed portion, said portions being provided with bearings extending over a part thereof.

34. A truck frame for a two-wheel car truck, comprising spaced side frames, and end bolsters connecting said side frames, said end bolsters having a central depressed portion, said portions being provided with bearings defined by upwardly extending flanges.

35. A truck frame for a two-wheel car truck, comprising spaced side frames, and end bolsters connecting said side frames, said end bolsters having a central depressed portion, said portions being provided with bearings, said bolsters and side frames being of substantially box-section.

36. In a car, the combination of a body provided with spaced transverse body members, a side bearing including an elongated body portion provided with longitudinally spaced side bearing members disposed between said transverse body members, said elongated body portion being provided with top and end connecting flanges for connecting the same to said body and transverse body members.

ALFRED H. OELKERS.